United States Patent
Braunberger

(10) Patent No.: US 9,598,294 B2
(45) Date of Patent: Mar. 21, 2017

(54) WATER SANITIZATION SYSTEM

(71) Applicant: VISION WORKS IP CORPORATION, Sequim, WA (US)

(72) Inventor: Fritz Braunberger, Sequim, WA (US)

(73) Assignee: Vision Works IP Corporation, Sequim, WA (US)

( * ) Notice: Subject to any disclaimer, the term of this patent is extended or adjusted under 35 U.S.C. 154(b) by 173 days.

(21) Appl. No.: 14/133,319

(22) Filed: Dec. 18, 2013

(65) Prior Publication Data

US 2015/0166368 A1   Jun. 18, 2015

(51) Int. Cl.
*E04H 4/16* (2006.01)
*E04H 4/12* (2006.01)
*C02F 1/32* (2006.01)
*C02F 103/42* (2006.01)

(52) U.S. Cl.
CPC ........... *C02F 1/325* (2013.01); *E04H 4/1263* (2013.01); *E04H 4/16* (2013.01); *E04H 4/1636* (2013.01); *C02F 2103/42* (2013.01); *C02F 2201/009* (2013.01); *C02F 2201/3222* (2013.01); *C02F 2303/04* (2013.01)

(58) Field of Classification Search
CPC ........ C02F 1/325; C02F 4/16; C02F 2103/42; C02F 2201/3222; C02F 2303/04; C02F 2201/009; E04H 4/16; E04H 4/1263
USPC ..... 210/167.11, 167.1, 242.1, 748.1, 748.11, 210/416.1, 416.2
See application file for complete search history.

(56) References Cited

U.S. PATENT DOCUMENTS

| | | | | |
|---|---|---|---|---|
| 3,845,291 A | * | 10/1974 | Portyrata | 362/192 |
| 4,253,307 A | * | 3/1981 | Smith | C02F 1/14 |
| | | | | 60/615 |
| 5,554,277 A | * | 9/1996 | Rief et al. | 210/94 |
| 6,358,425 B1 | * | 3/2002 | King | 210/764 |
| 6,792,956 B2 | * | 9/2004 | Bredo et al. | 134/22.18 |
| 8,298,411 B2 | * | 10/2012 | Roberts | C02F 3/14 |
| | | | | 210/170.09 |
| 2006/0113256 A1 | * | 6/2006 | Birkbeck | C02F 1/4606 |
| | | | | 210/748.17 |
| 2006/0226060 A1 | † | 10/2006 | Mercer | |
| 2011/0064626 A1 | * | 3/2011 | Kennedy | 422/243 |
| 2012/0037571 A1 | * | 2/2012 | Felix | 210/748.11 |

* cited by examiner
† cited by third party

*Primary Examiner* — Fred Prince
(74) *Attorney, Agent, or Firm* — Haverstock & Owens LLP

(57) ABSTRACT

A non-chemical sanitation system for a body of water comprises a floating base, an internal hydro-electric power generator, and one or more sanitizing mechanisms electrically powered by the hydro-electric power generator, where the hydro-electric power generator derives its energy from water pressure produced by a pool pump. In some embodiments, the one or more non-chemical sanitizing mechanisms comprise one or more ultraviolet LED lights. In some embodiments, the one or more non-chemical sanitizing mechanisms comprise one or more ionizers. In some embodiments, the system is connected to a filter pipe and filter of a pool and the hydro-electric power generator is placed within the path of water flowing to the pool filter in order to generate power and power the one or more sanitizing mechanisms.

20 Claims, 5 Drawing Sheets

WATER SANITIZATION SYSTEM

FIELD OF THE INVENTION

This invention generally relates to systems and methods for disinfecting and sanitizing a body of water. More particularly, this invention relates to non-chemical water sanitation systems.

BACKGROUND OF THE INVENTION

Keeping swimming pools and spas clean and free of other germs and bacteria has historically meant adding harsh chemicals such as chlorine and bromine to the water. Using and storing such chemicals can be hazardous to humans and the environment. Consequently, there has been a push to find non-chemical alternatives.

In recent years, new technology has been introduced that attempts to eliminate the harmful chemicals. This technology consists of immersing ultraviolet radiating lamps and ionizers into the water stream of the pools and spas. The ultraviolet light and the ionizers kill germs and bacteria within the water of the pools and spas.

However, because these systems are often retrofitted into existing swimming pools and spas the cost of implementation is often high and thus is discouraging over other lower cost methods. The high cost of implementation is often associated with supplying power in sufficient quantity to the ultraviolet light fixtures and/or the ionizers. Some systems use batteries which must be changed often and may corrode causing a hazardous condition. Alternatively, some systems obtain power from the main AC supply of the pool or spa. In such cases, wire and conduits must be run which involves a substantial modification to the pool or spa including work by an electrician following local building, electrical, and fire codes and the procurement of permits. Additionally, some systems use photo-electric cells affixed to the ground or attached to the top of a floating head. In either case, the photo-electric cells are very expensive on a per watt basis and require a significant amount of space to generate a reasonable amount of power.

SUMMARY OF THE INVENTION

A non-chemical sanitation system for a body of fluid comprises a floating base, an internal hydro-electric power generator, and one or more sanitizing mechanisms electrically powered by the hydro-electric power generator. In some embodiments, the one or more non-chemical sanitizing mechanisms comprise one or more ultraviolet LED lights. In some embodiments, the one or more non-chemical sanitizing mechanisms comprise one or more ionizers. In some embodiments, the system is connected to a filter pipe and filter of a pool and the hydro-electric power generator is placed within the path of fluid flowing to the pool filter in order to generate power and power the one or more sanitizing mechanisms.

DETAILED DESCRIPTION OF THE INVENTION

A non-chemical sanitation system for a body of water comprises a floating base, an internal power system and one or more non-chemical sanitizers for killing germs and other bacteria within the body of water. The system is able to use an internal power source for powering the one or more non-chemical sanitizing mechanisms. For example, in some embodiments, the sanitation system is powered by a hydro-electric power system. The hydro-electric power system is able to generate power using water that flows through an intake pipe of the sanitation system. In some embodiments, the one or more non-chemical sanitizing mechanisms comprise one or more ultraviolet LED lights. In some embodiments, the one or more non-chemical sanitizing mechanisms comprise one or more ionizers.

Figure 1:
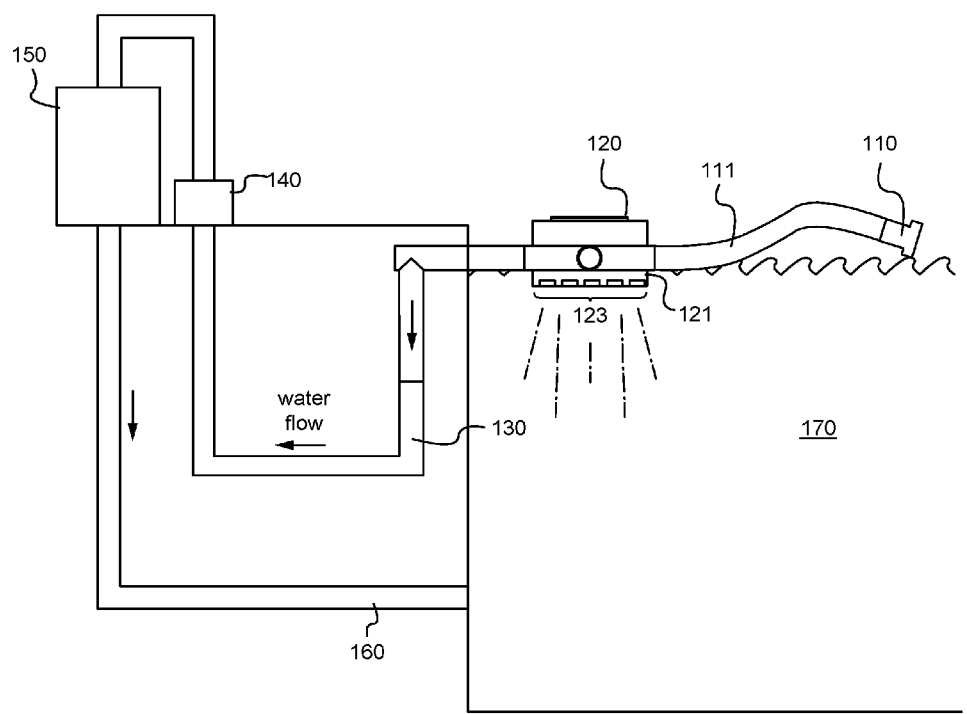
FIG. 1 illustrates a high level view of a sanitation system for a body of water in accordance with some embodiments.

Referring now to FIG. 1, a high level view of a sanitation system for a body of water is depicted therein. The sanitation system 100 comprises a sanitizing head 120 coupled to a sweep pipe 110 and sweep head 110 at one end and coupled to a filter pipe 130 at the other end. In some embodiments, the sanitizing head 120 comprises one or more sanitization mechanisms 123 coupled to a base plate 121. The one or more sanitizing mechanisms 123 are able to disinfect and sanitize the pool 170 by eliminating germs and bacteria from the water. In some embodiments, the one or more sanitizing mechanisms 123 comprise one or more ultraviolet LED lights. In some embodiments, the one or more sanitizing mechanisms 123 comprise one or more ionizers.

The filter pipe 130 is coupled to the pool filter 150 and the pool pump motor 140. When the pool pump 140 is running, water is sucked from the pool 170, through the sweep head 110 and sweep pipe 110 and into the filter pipe 130 to the filter 150 where the water is filtered before it returns to the pool through the return pipe 160. In some embodiments, the sanitizing head 120 comprises a hydro-electric generator which is placed in the path of the water flowing to the pool filter. The hydro-electric generator is able to capture electrical power from the water flow through the pools filter 150 and the electrical power is able to be used to power the one or more sanitization mechanisms 123.

As shown in FIG. 1, the sanitizing head 120 floats on top of the water with the one or more sanitizing mechanisms 123 pointing in a downward direction. In this manner the sanitizing head 120 is able to disinfect and sanitize the pool water as it flows under the sanitizing head 120. In some embodiments, the one or more sanitizing mechanisms 123 are placed near the hydro-electric generator in order to disinfect and sanitize the pool water as it passes through the sanitizing head 120. Additionally, although the system 100 is shown implemented in a pool, as will be apparent to someone of ordinary skill in the art, the system 100 is able to be implemented in any appropriately desired body of water such as a pool or a spa. Further, although the sanitizing head 120 is shown floating on the surface of the water, it is able to be paced in a static location such as on a side of the pool or next to the pool's filter pipe 130.

Figure 2:
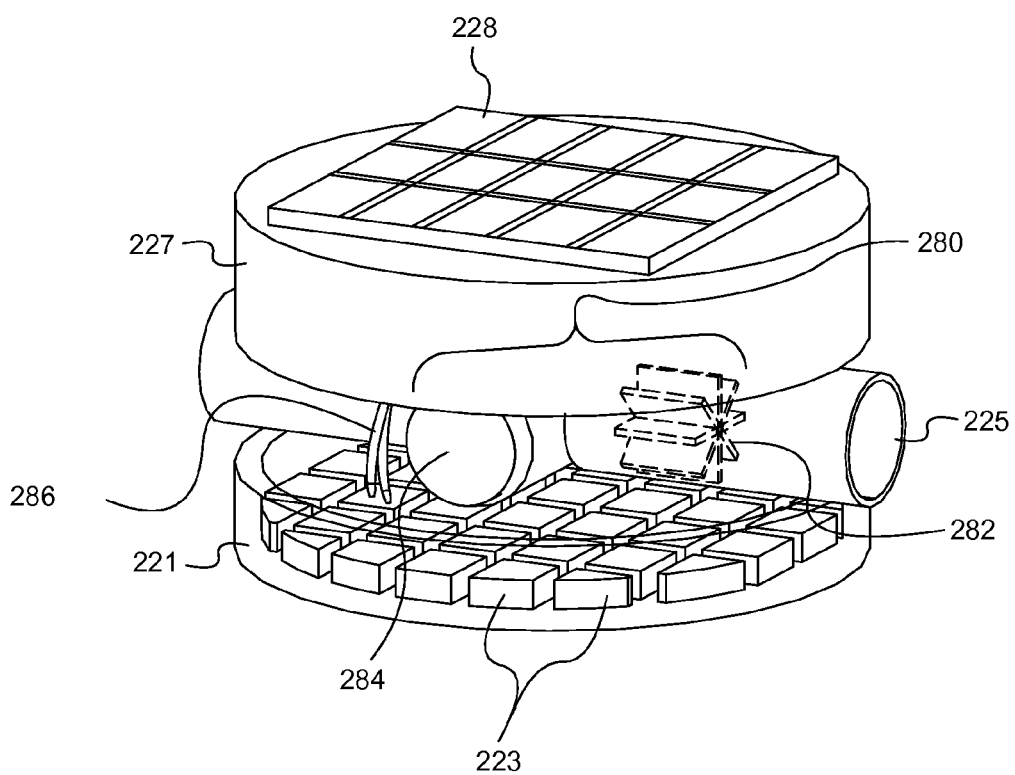
FIG. 2 illustrates a sanitizing head for a sanitation system, in accordance with some embodiments.

FIG. 2 illustrates a close-up view of the sanitization head 120 as discussed in relation to FIG. 1. The sanitization head 220 comprises a floating platform 227, a base plate 221 comprising one or more sanitization mechanisms 223 and an intake pipe 225. In some embodiments, the intake pipe 225 is coupled to a sweep pipe and a filter pipe, such as described above. Consequently, water traveling to the pool filter passes through the intake pipe 225 and contacts a hydro-electric power generator 280. As stated above, the hydro-electric generator 280 is able to capture electrical power from the water flow through the pools filter and the electrical power is able to be used to power the one or more sanitization mechanisms 223. As shown in FIG. 2, in some embodiments, the hydro-electric power generator 280 comprises an impeller 282 and a generator 284. As water flows through the intake pipe 225, the impeller 282 is spun generating power which is transferred from the generator 284 to the one or more sanitizing mechanisms 223 through a wired connection 286.

As described above, in some embodiments, the one or more sanitizing mechanisms 223 comprise one or more ultraviolet LED lights. In some embodiments, the one or more sanitizing mechanisms 223 comprise one or more ionizers. Additionally, although the one or more sanitizing mechanisms 223 are shown coupled to a base plate 221 of the sanitizing head 220, the one or more sanitizing mechanisms 223 are able to be placed at any appropriate location on the sanitizing head 220. For example, in some embodiments, the one or more sanitizing mechanisms are located on an interior of the intake pipe 225. In some embodiments, the sanitization head 220 comprises a solar panel 228 for providing additional power to the one or more sanitizing mechanisms 223.

Figure 3:
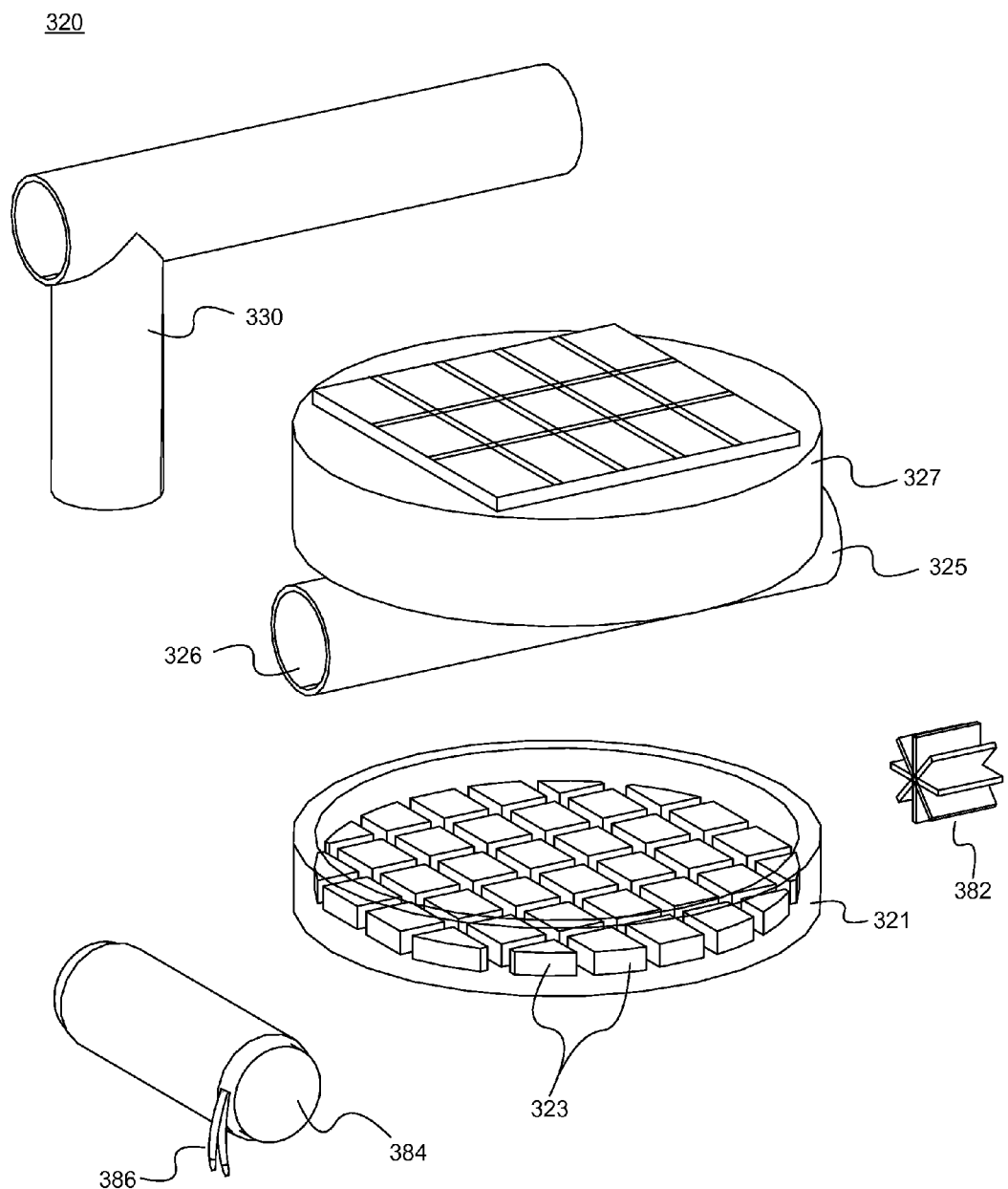
FIG. 3 illustrates an exploded view of a sanitizing head for a sanitation system, in accordance with some embodiments.

FIG. 3 illustrates an exploded view of a sanitization head 320 in accordance with some embodiments. The sanitization head 320 comprises a floating platform 327, a base plate 321 comprising one or more sanitization mechanisms 323 and an intake pipe 325. In some embodiments, the intake pipe 325 is coupled to a sweep pipe and a filter pipe 330, such as described above. As shown in FIG. 3, the hydro-electric generator comprises an impeller 382 and a generator 384. As water flows through the intake pipe 325, the impeller 382 is spun generating power which is transferred from the generator 384 to the one or more sanitizing mechanisms 323 through a wired connection 386.

As further shown in FIG. 3, the one or more sanitizing mechanisms 323 are shown coupled to a base plate 321. However, as described above, the one or more sanitizing mechanisms 323 are able to be placed at any appropriate location on the sanitizing head 320. For example, in some embodiments, the one or more sanitizing mechanisms are located on an interior of the intake pipe 325. In some embodiments, the sanitization head 320 comprises a solar panel 328 for providing additional power to the one or more sanitizing mechanisms 323.

Figure 4:
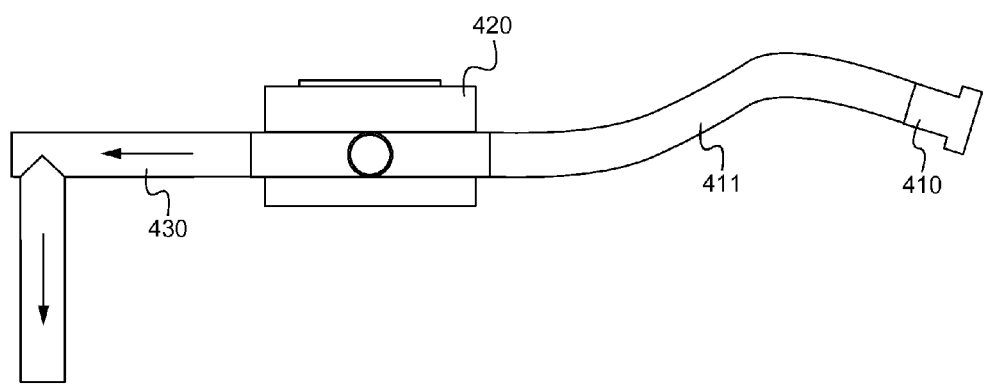
FIG. 4 illustrates a pool sweep and a sanitizing head, in accordance with some embodiments.

FIG. 4 illustrates a sanitization head attached to a pool sweep. The sanitization head 420 is similar to the sanitization heads 120, 220, and 320, as described above. As shown by the arrows of FIG. 4, water is sucked through the sweep head 410 and the sweep pipe 411 and through the sanitization mechanism 420 where it contacts a hydro-electric generator before passing to the filter pipe 430 and the pool filter (not shown).

Figure 5A:
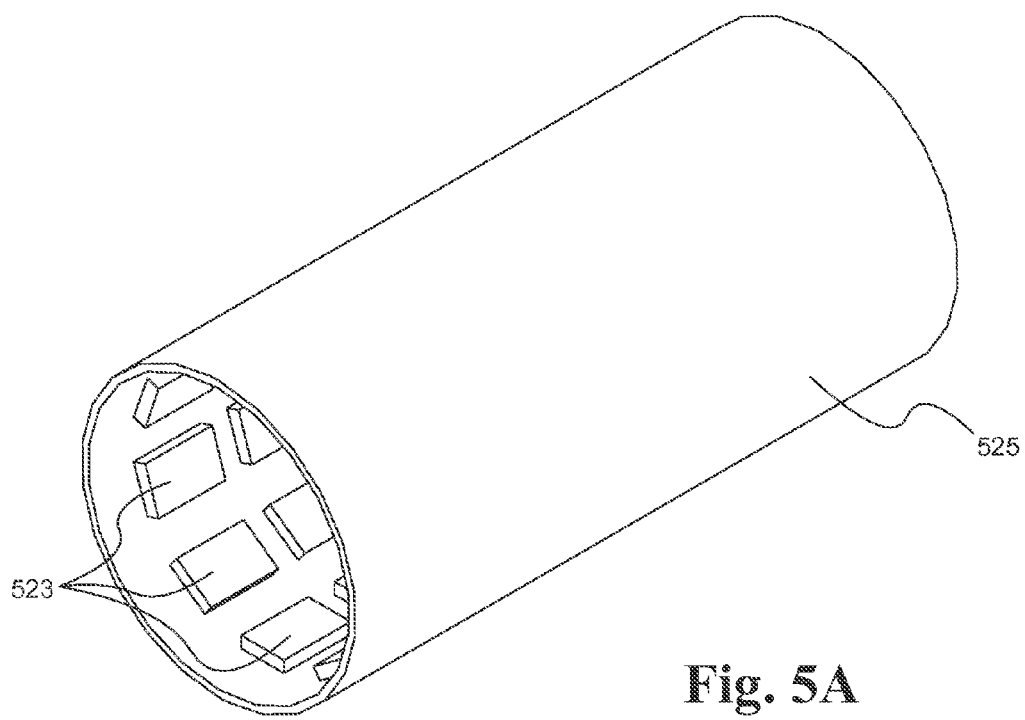
FIG. 5A illustrates an intake pipe for a sanitizing head, in accordance with some embodiments.
Figure 5B:
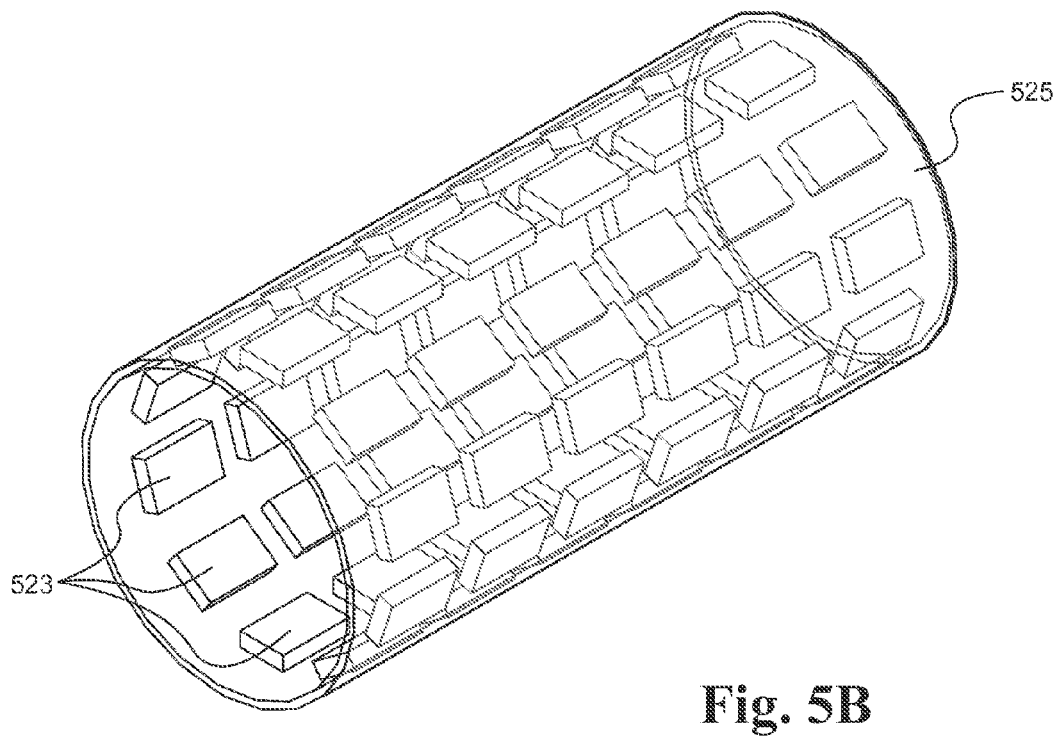
FIG. 5B illustrates a x-ray view of an intake pipe for a sanitizing head, in accordance with some embodiments.

FIGS. 5A and 5B illustrate one or more sanitizing mechanisms 523 coupled to an interior of an intake pipe 525, such as shown in FIGS. 2 and 3. As shown within FIGS. 5A and 5B, the one or more sanitizing mechanisms 523 are coupled around an entirety of an interior of the intake pipe 525. As will be apparent to someone of ordinary skill in the art, any number of sanitizing mechanisms 523 are able to be coupled to the intake pipe 525 and in any appropriately desired configuration. When the one or more sanitizing mechanisms are located within the intake pipe 525, the intensity of the one or more sanitizing mechanisms 523 are able to be increased without exposing the surrounding environment and pool area to the sanitizing process of the one or more sanitizing mechanisms 523.

In use, the sanitizing head and system is able to capture electrical power from water flow to a pool's filter using a small hydro-electric generator mounted within a floating head comprising one or more sanitizing mechanisms. Pool filter motors are typically very powerful and may range from one-half horse power to many horsepower depending upon the size of the system. Consequently, installing a hydro-electric generator within the path of the flowing water enables the system to recapture a high percentage of the power of the filter pump motor to be utilized for disinfecting and sanitizing the pool's water. Extracting high, electrical power, from water pressure, at the point of the pool, eliminates the need for more expensive distribution means and will result in more pools being disinfected using ultraviolet and electric sanitizing means.

Particularly, providing an internal power source to the sanitizing head and system eliminates the need for wires, conduits, electricians, and permits and enables the system to be implemented similarly within existing and new pool systems. Specifically, the sanitizing head is easily coupled to a pool's filter pipe and pump in order to power one or more sanitizing mechanisms to clean and disinfect the pool water using a process, which the pool system was already implementing. Consequently, the pool is able to be cleaned at a greater rate and at less cost than existing systems. Accordingly, the sanitizing head and system as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A sanitizing head for sanitizing a body of fluid comprising:
   a. a floating base;
   b. a hydro-electric power generator coupled to the floating base for electrically powering the sanitizing head; and
   c. one or more non-chemical sanitization mechanisms coupled to the floating base pointing downward for sanitizing the body of water as the water flows under the sanitizing head.

2. The sanitizing head of claim 1 wherein the one or more non-chemical sanitization mechanisms comprise one or more ultraviolet LED lights.

3. The sanitizing head of claim 1 wherein the one or more non-chemical sanitization mechanisms comprise one or more ionizers.

4. The sanitizing head of claim 1 wherein the floating base comprises a pool or spa sweep.

5. The sanitizing head of claim 4 wherein the sanitizing head comprises an intake pipe that is configured to couple to an filter pipe of a filter pump of the pool or spa.

6. The sanitizing head of claim 5 wherein the sanitizing head comprises a hydro impeller coupled to a power generator, wherein the hydro impeller is spun by water traveling the through the intake pipe in order to generate power.

7. The sanitizing head of claim 1 wherein the floating base comprises a solar panel.

8. The sanitizing head of claim 1 wherein the body of fluid comprises a pool or a spa.

9. A pool cleaner comprising:
   a. a sweep head for passing water to a pool filter, the sweep head coupled to an intake pipe and the pool filter; and
   b. a hydro-electric powered sanitization head comprising one or more non-chemical sanitizing mechanisms pointing downward to sanitize a body of water as it flows under the sanitization head.

10. The pool cleaner of claim 9 wherein the one or more non-chemical sanitizing mechanisms comprise one or more ultraviolet LED lights.

11. The pool cleaner of claim 9 wherein the one or more non-chemical sanitizing mechanisms comprise one or more ionizers.

12. The pool cleaner of claim 9 wherein the pool cleaner is configured to couple to an filter pipe of a filter pump of the pool.

13. The pool cleaner of claim 9 wherein the sanitization head comprises a floating base.

14. The pool cleaner of claim 9 wherein the sanitization head comprises a solar panel.

15. A pool sanitization system comprising:
   a. a sweep head;
   b. a sweep pipe;
   c. a pool filter, and
   d. a sanitization head coupled to a filter pipe of the pool filter, the sanitation head comprising one or more non-chemical sanitization mechanisms pointing downward for sanitizing a body of water as it flows under the sanitization head;

wherein the sanitization head comprises a hydro-electric power generator that is in the path of water traveling to the pool filter and wherein the hydro-electric power generator powers the sanitization head.

16. A sanitizing head for sanitizing a body of water comprising:
   a. a floating base;
   b. a hydro-electric power generator coupled to the floating base for electrically powering the sanitizing head;
   c. a water pipe coupled to the floating base;
   d. one or more first non-chemical sanitization mechanisms coupled to the floating base and pointing downward for sanitizing the body of water as it flows under the floating base; and
   e. one or more second non-chemical sanitization coupled to an interior of the pipe for sanitizing the body of water.

17. The sanitizing head of claim 16 wherein the hydro-electric power generator is located within the pipe.

18. The sanitizing head of claim 17 wherein the one or more first non-chemical sanitization mechanisms and the one or more second non-chemical sanitization mechanisms comprise one or more ultraviolet LED lights.

19. The sanitizing head of claim 17 wherein the one or more first non-chemical sanitization mechanisms and the one or more second non-chemical sanitization mechanisms comprise one or more ionizers.

20. A non-chemical sanitation system for a body of water comprises a floating base, an internal hydro-electric power generator, coupled to the floating base, and one or more non-chemical sanitizing mechanisms coupled to the floating base and pointing downward for sanitizing water as it flows under the floating base and electrically powered by the hydro-electric power generator.

* * * * *